June 4, 1957 W. J. MORRILL 2,794,877
HYSTERESIS ACTUATOR
Filed Aug. 20, 1954 2 Sheets-Sheet 1

INVENTOR.
WAYNE J. MORRILL
BY
Woodling and Krost,
attys.

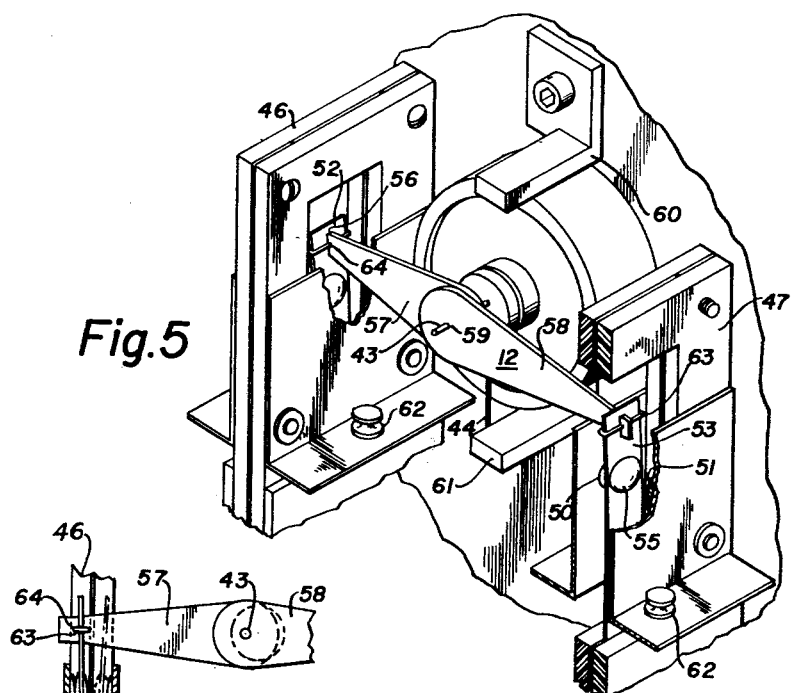
Fig. 5
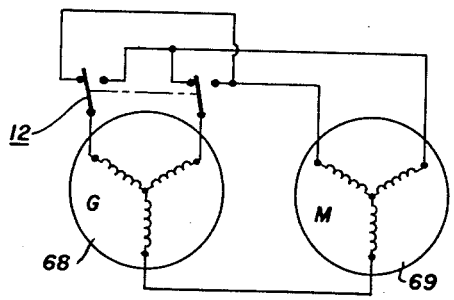
Fig. 6
Fig. 8
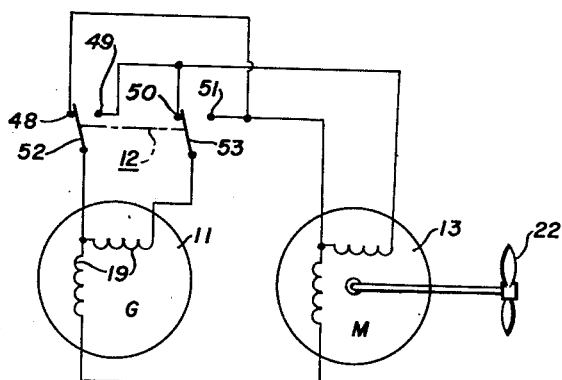
Fig. 7
INVENTOR.
WAYNE J. MORRILL United States Patent Office 2,794,877
Patented June 4, 1957

2,794,877
HYSTERESIS ACTUATOR

Wayne J. Morrill, Garrett, Ind.

Application August 20, 1954, Serial No. 451,140

9 Claims. (Cl. 200—61.39)

The invention relates in general to hysteresis actuated devices and more particularly to a hysteresis actuated reversing switch having particular adaptability to an electrical generator adapted to have a reversible direction and hence electrical output with the switch being actuated by the change of rotational direction to supply electrical power to a motor of only a single condition.

Railway rolling stock, such as refrigerator cars, frequently use fans to circulate air throughout the car, such as through a cooling compartment to cool produce carried in the refrigerator car. In the past a mechanical coupling between the car wheel and the fan has been utilized. The refrigerator car is, of course, adapted to be moved in either direction; and hence, the fan may be driven in both directions unless some provision is made for reversing the drive train. It is desirable to make the fans blow air in the same direction regardless of the direction of the movement of the refrigerator car. Electrical systems have been used wherein a generator has been driven by the movement of the car wheel with the generator supplying power to electric motors driving the circulating fans. In the past there has also been some form of switching arrangement mechanically operated to reverse the power to the motor upon reverse direction of movement of the refrigerator car so that the fans always blow air in one direction. This mechanical switching arrangement has been undesirable in that it is subject to wear and breakage and consequent malfunctioning.

An object of the invention therefore is to provide a switching arrangement between a generator and a motor to keep the motor's rotational direction constant regardless of the rotational direction of the generator and to accomplish this switching by a means which has no mechanical part subject to wear.

Another object of the invention is to provide a switch mechanism operated by a hysteresis drag effect.

Still another object of the invention is to provide a switch connected between a reversible generator and a motor to prevent reverse operation of the motor.

Still another object of the invention is to provide a toggle joint mechanism to actuate a switch wherein the knee of the toggle joint is straightened out in each of the two alternative positions of the switch mechanism to thus lock the switch into these positions so that vibratory motion, such as may be produced by movement of the refrigerator car, will not cause contact chatter.

Another object of the invention is to provide a switch operating mechanism wherein there is no mechanical striking or mechanical movement after the switching is accomplished.

Another object of the invention is to provide a switch operating mechanism wherein the operating torque is not subject to variation due to wear or age.

Still another object of the invention is to provide for the opening and closing of the switch contacts within the first 180 degrees of rotation of the generator.

Still another object of the invention is to provide a switch operating mechanism for a generator and motor electrical circuit wherein the contacts are opened and closed under extremely low current conditions to thus maintain exceptionally long contact life.

Still another object of the invention is to provide a reversing switch mechanism which is small and rugged, is easy to manufacture and assemble, and which may be readily attached to and disassembled from a generator or other dynamoelectric machine.

Still another object of the invention is to provide a reversing switch in connection with a reversible generator wherein the switch is actuated during the first revolution of the generator for each change of directional rotation, and from then on there is no contact movement, and wherein the generator may be stopped and started unidirectionally without actuation of the switch mechanism or without any mechanical striking or mechanical movement.

Other objects and a fuller understanding of this invention may be had by referring to the following description and claims, taken in conjunction with the accompanying drawings, in which:

Figure 5 is an enlarged isometric view of the switching mechanism;

Figure 6 is a sectional view through the switch contact mechanism;

Figure 7 is an electrical circuit diagram of the switch applied to a two-phase generator and motor circuit; and Figure 8 is a schematic diagram of the switch applied to a three-phase generator and motor circuit.

Figure 1:
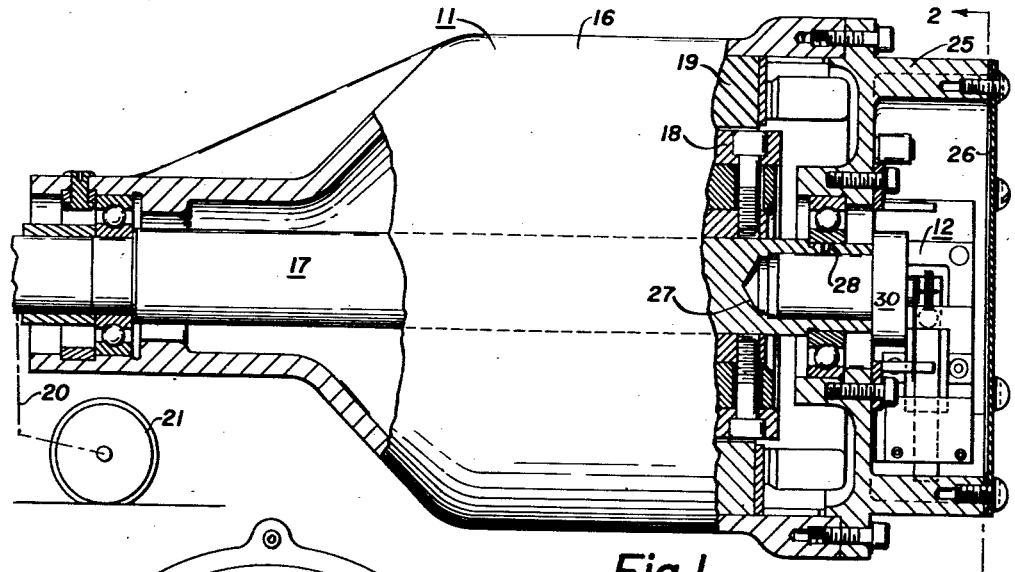
Figure 1 is an elevational view partially in section of a complete generator embodying the hysteresis actuated reversing switch.

The Figure 7 shows schematically the circuit diagram wherein a generator 11 supplies power through a reversing switch 12 to a motor 13. The generator 11 in this case is some form of dynamoelectric machine having an electrical output which has two different conditions in accordance with the two opposite rotational directions thereof. In this case the generator 11 has been illustrated as a two-phase generator, and the two different electrical conditions would be the two different phase rotations of the electrical output. The motor 13 is, of course, compatible to the electrical input thereof and has for purposes of illustration been shown as a two-phase motor.

The Figures 1 to 6 show the construction details of the generator 11 and switch 12. The generator 11 has a housing 16 with a shaft 17 journalled therein. The generator 11 happens to be of the rotating field type having a rotor 18 and stator armature windings 19. The shaft 17 is driven from any suitable prime mover and has been diagrammatically shown as being driven through a drive connection 20 from a railway car wheel 21. The stator armature windings 19 are shown schematically in Figure 7, and it will be understood that with reversed rotational direction of the rotor 18, the phase rotation of the alternating current output of the generator 11 will be reversed. If the generator output were connected directly to the two-phase motor 13, this would cause a reverse rotational direction of the motor 13 and of the mechanical load 22 thereof which has been diagrammatically illustrated as a fan. The switch 12, however, is a reversing switch which is used to reverse the electrical condition of the generator output with each rotational reversal of the generator rotation to thus maintain the motor 13 always running in the same direction.

The switch 12 has been conveniently built into the end of the housing 16 of the generator 11. A new end bell 25 has been provided on the housing 16 with this end bell closed by a cover plate 26.

The shaft 17 is provided with a coaxial end cavity 27 with a cross drilled hole 28 in the side wall thereof. The coaxial cavity 27 is adapted to receive a hysteresis actuator 30. The hysteresis actuator 30 includes generally a first part or first rotor 31 and a second part or second rotor 32. The first rotor 31 has an outer cylindrical surface 33 which is adapted to be received within the coaxial cavity 27. When so received, a ball detent 34 engages the cross drilled hole 28 to hold the actuator 30 within the cavity 27 and to cause the first rotor 31 to rotate in either direction directly in accordance with the rotation of the shaft 17. The ball detent 34 thus permits ready insertion and removal of the hysteresis actuator, yet provides for positive rotation of the first rotor 31.

Bearings 35 and 36 journal the second rotor 32 relative to the first rotor. The second rotor 32 includes a shaft 37 which is journalled in the bearings 35 and 36 and a six-pole permanent magnet 38. The outer surface 39 of the magnet 38 constitutes the pole faces and may be a smooth cylindrical surface. The bearings 35 and 36 assure close running clearance between the pole face surface 39 and an inner cylindrical surface 40 of hysteresis magnetic material 41 carried by the first rotor 31. This hysteresis magnetic material may be of some material such as chrome magnet steel which has high retentivity, however, it is not permanently magnetized in this application. There is a small and closely controlled air gap between the cylindrical surfaces 39 and 40 so that upon relative rotation of these surfaces a hysteresis drag or hysteresis attraction is established to attempt to retard such relative rotation or in other words to cause one member to rotate directly in accordance with the rotation of the other member. The shaft 37 has a head 42 and an eccentric or crank pin 43. The head 42 carries a stop spring 44 with this spring wire passing through a hole bored in the head 42 and then partially wrapped around the head in a groove 45.

The enlarged view of Figure 5 perhaps best illustrates the switch mechanism as controlled by the crank pin 43. Insulator frames 46 and 47 are carried by the end bell 25. The insulator frame 46 carries fixed contacts 48 and 49, and the frame 47 carries fixed contacts 50 and 51. Movable switch blades 52 and 53 are carried in the insulator frames 46 and 47, respectively, with these switch blades carrying double-sided contacts 54 and 55, respectively. The base of the switch blades 52 and 53 is mounted in the frames 46 and 47 so that the upper ends thereof may flex transversely to the planes of these blades. An elongated aperture 56 is provided in the upper end of each of the blades 52 and 53, and the outer portions of insulator arms 57 and 58 pass through these apertures. The outer ends of the insulator arms 57 and 58 are connected to the switch blades 52 and 53 by spring clips 63 passing through a slot 64 in the ends of the arms 57 and 58. The inner ends of the insulator arms 57 and 58 are provided with an aperture 59 to pass over the crank pin 43. Stop lugs 60 and 61 are also provided on the end bell 25. Terminals 62 are provided on the mounting blades for the fixed contacts 48 to 51 to provide electrical connection to the switch 12.

Operation

Figure 2:
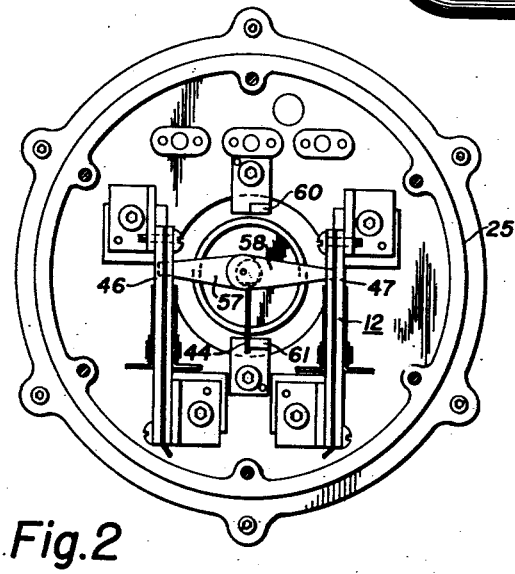
Figure 2 is a section on the line 2—2 of Figure 1.
Figure 4:
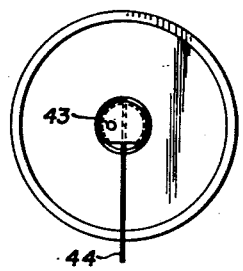
Figure 4 is an end view of the actuator of Figure 3.
Figure 3:
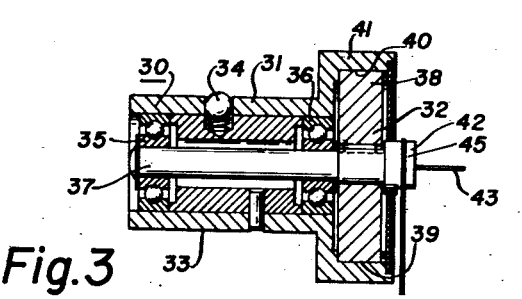
Figure 3 is an enlarged sectional elevational view of the hysteresis actuator.

The switch 12 has been shown in the left-most position in Figures 2, 5, 6, and 7. This will be the condition when the car wheel 21 has been rotated in a particular direction for some time. If now the railway car is moved in the opposite direction, this will rotate the shaft 17 in the opposite direction which will be clockwise as viewed in Figures 2, 5, and 6. This clockwise rotation carries with it the first rotor 31 because of the ball detent 34. The hysteresis attraction between the cylindrical surfaces 39 and 40 causes the magnet 38 to rotate directly with the first rotor 31 in such clockwise direction. The stop spring 44 has previously been in contact with the stop lug 61. Now with this clockwise rotation the stop spring permits movement of the second rotor 32. The second rotor therefore rotates approximately 180 degrees until the stop spring 44 comes into contact with the stop lug 60. The crank pin 43 therefore moves through a 180 degree arc above the horizontal plane passing through the axes of the shafts 17 and 37. The insulator arms 57 and 58 therefore move the switch blades 52 and 53 to the right as shown in Figures 2, 5, and 6 to establish the second of the two electrical conditions of the switch 12. As shown in Figure 7, this reverses the phase rotation of the generator output; and hence, with this initial portion of the reverse rotation of the car wheel 21, the switching is completed so that the motor 13 continues to rotate in the same direction as before. Due to the nature of the slow acceleration of the prime mover 21, this switching is accomplished at very low speeds and at minimum generated current conditions. This means that the switch contacts may be smaller than would normally be used to handle a generator and motor circuit of this electrical capacity, yet even with this smaller size contacts, extremely long contact life can be maintained.

As the car wheel 21 continues to rotate the shaft 17 in the clockwise direction, the switch 12 remains in its second electrical condition. The stop spring 44 remains in contact with the stop lug 60 and hence the second rotor 32 is stationary. The first rotor 31, of course, rotates with the shaft 17. The hysteresis drag between the cylindrical surfaces 39 and 40 thus takes the place of mechanical friction but does not wear out and does not change or age. It will be noted that the railway car may be stopped and started unidirectionally and the switch 12 will not be actuated nor will there be any mechanical striking or mechanical movement within the switch 12. This further maintains long contact life. With reversal of the direction of movement of the railway car the shaft 17 will be rotated counterclockwise as shown in Figures 2, 5, and 6 and the second rotor 32 will move with the first rotor 31 by hysteresis magnetic attraction to return to the position shown in these Figures 2, 5, and 6. This actuates the switch blades 52 and 53 to the left as shown, and thus the switch 12 is again reversed to cause only unidirectional rotation of the motor 13.

It will be noted that the crank pin 43 forms the knee of a toggle joint mechanism with the end points of this toggle joint mechanism being one of the connections to the corresponding switch blade and the axes of the shafts 17 and 37. Since in both limit positions of the stop spring 44 the crank pin is in a horizontal line with the shaft axes and the spring clips 63, it will be noted that this toggle joint mechanism is in a locked position to firmly lock the movable contacts against the fixed contacts. Thus, the switch blades 52 and 53 may be made relatively stiff and still a relatively small amount of hysteresis torque will be able to actuate these switch blades because of the practically infinite mechanical advantage developed by the toggle joint mechanism. Because of the toggle joint mechanism and because of the stiff switch blades 52 and 53, there will be no contact chatter or bounce even during severe vibration of the railway car.

The Figure 8 shows that the switch 12 may be used without change in connection with a three-phase generator 68 and motor 69 and will in such case still provide the reversal of the electrical condition of the generator output, namely, to reverse the phase rotation of the generated voltages.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A hysteresis actuated switch for an electric generator of reversible rotational direction supplying power through said switch to a motor desired to have only a single rotational direction, said generator having a housing and a rotating armature, said switch comprising, hysteresis magnetic material mounted for rotation with said armature, a surface defining a smooth bore in said magnetic material, a rotor journalled for rotation relative to said magnetic material, a permanent magnet carried for rotation with said rotor, stops cooperating between said housing and said rotor to limit rotation thereof to an arc of less than three hundred sixty degrees, said smooth bore surface being rotatable closely adjacent the pole faces of said magnet, a crank eccentric on said rotor, a switch blade mechanism, insulator means forming a toggle joint mechanism connected at a common point to said crank eccentric and connected to said switch blade mechanism for operation of same from a first position to a second position by said limited arcuate rotation of said crank eccentric, whereby with reversal of rotational direction of said generator armature the rotor is moved through said limited arc relative to said housing by hysteresis magnetic drag with said magnetic material to move said switch blade mechanism to the alternative position and lock same thereat and thus prevent reverse rotation of said motor, yet said generator armature may be stopped and started unidirectionally without actuation of said switch blade mechanism.

2. A hysteresis actuated reversing switch for an electric generator of reversible rotational direction supplying power through said switch to a reversible motor desired to have only a single rotational direction, said generator having a housing and a rotating armature, said switch comprising, hysteresis magnetic material mounted to be rotatable with said armature for bidirectional rotation, a surface defining a smooth bore in said magnetic material, a rotor journalled for rotation relative to said magnetic material, a permanent magnet carried for rotation with said rotor, stops cooperating between said housing and said rotor to limit rotation thereof to an arc of less than three hundred sixty degrees, said smooth bore surface being rotatable closely adjacent the pole faces of said magnet, a crank eccentric on said rotor, a double-throw switch blade mechanism, insulator means interconnecting said crank eccentric and said switch blade mechanism for operation of same from a first position to a second position by said limited arcuate rotation of said crank eccentric, whereby with each reversal of rotational direction of said generator armature the rotor is moved through said limited arc by hysteresis magnetic drag with said magnetic material to move said switch blade mechanism to the alternative position and thus maintain unidirectional rotation of said motor, yet said generator armature may be stopped and started unidirectionally without actuation of said switch blade mechanism.

3. A hysteresis actuated reversing switch for an electric generator of reversible rotational direction supplying power through said switch to a reversible motor desired to have only a single rotational direction, said generator having a housing and a rotating armature shaft having a coaxial cavity, said switch comprising, a first rotor of hysteresis magnetic material insertable in said shaft coaxial cavity, a ball detent in said first rotor engaging said shaft for bidirectional rotatable driving connection between said shaft and first rotor, a surface defining a smooth bore in said first rotor, a second rotor journalled in said first rotor, a multi-pole permanent magnet carried for rotation with said second rotor, stops cooperating between said housing and said second rotor to limit rotation thereof to approximately one hundred eighty degrees, said smooth bore surface being rotatable closely adjacent the pole faces of said magnet, a crank eccentric on said second rotor, a double-throw multi-pole switch blade mechanism, insulator arm means interconnecting said crank eccentric and said switch blade mechanism for operation of same from a first position to a second position by one hundred eighty degree rotation of said crank eccentric, whereby with each reversal of rotational direction of said generator armature shaft the second rotor is moved through approximately one hundred eighty degrees relative to said housing by hysteresis magnetic drag with said first rotor to move said switch blade mechanism to the alternative position and thus maintain unidirectional rotation of said motor, yet said generator armature may be stopped and started unidirectionally without actuation of said switch blade mechanism.

4. A hysteresis actuated reversing switch for a multiphase electric generator of reversible rotational direction supplying power through said switch to a multi-phase motor desired to have only a single rotational direction, said generator having an end bell and a rotating armature on a shaft having an end cavity, said switch comprising, a first rotor of hysteresis magnetic material insertable in said shaft end cavity, a ball detent in said first rotor engaging said shaft for bidirectional rotatable driving connection between said shaft and first rotor, a surface defining a smooth bore in said first rotor, a second rotor journalled in said first rotor, a six pole permanent magnet carried for rotation with said second rotor, stops cooperating between said end bell and said second rotor to limit rotation thereof to approximately one hundred eighty degrees, said smooth bore surface being rotatable closely adjacent the faces of said six pole magnet, a crank eccentric on said second rotor, a double-throw multi-pole switch blade mechanism, an insulator arm interconnecting said crank eccentric and said switch blade mechanism for operation of same from a first position to a second position by one hundred eighty degree rotation of said crank eccentric, whereby with each reversal of rotational direction of said generator armature the second rotor is moved through approximately one hundred eighty degrees relative to said end bell by hysteresis magnetic drag with said first rotor to move said switch blade mechanism to the alternative position and thus maintain unidirectional rotation of said motor, yet said generator armature may be stopped and started unidirectionally without actuation of said switch blade mechanism.

5. A switch comprising, a first part, a movable contact, a second contact carried for cooperation with said movable contact, said movable contact having first and second relative positions, a toggle mechanism operable by limited arcuate rotation to alternatively lock said movable contact in said first and second positions, and a hysteresis actuator having second and third parts with said second part operating said toggle mechanism, one of said first and third parts adapted for rotation bidirectionally greater than one hundred eighty degrees, and stop means cooperating between said second part and one of said first and third parts to limit rotation therebetween to said limited arc, one of said second and third parts comprising a permanent magnet having pole faces disposed on a generally cylindrical surface, a substantially smooth cylindrical surface of hysteresis magnetic material on the other of said second and third parts closely adjacent the pole faces of said magnet whereby hysteresis magnetic drag action between said pole faces and said smooth cylindrical surface effects actuation of said toggle mechanism through said limited arc upon initial rotation in either direction of said rotatable one of said first and third parts to thus actuate said movable switch contact.

6. A switch comprising, a frame, a movable switch blade, movable contacts carried by said blade, stationary contacts carried on said frame for cooperation with said movable contacts, said blade having first and second positions, a toggle joint mechanism having a one hundred eighty degree limited rotation to alternatively lock said blade in said first and second positions, and a hysteresis actuator having first and second parts with said first part operating said toggle joint mechanism, said second part adapted for rotation bidirectionally greater than one hundred eighty degrees, and stop means cooperating between said first part and said frame to limit rotation of said first part to said one hundred eighty degree movement, said first part comprising a six pole permanent magnet having pole faces disposed on a generally cylindrical surface, said second part having hysteresis magnetic material and being journalled coaxially with said first part, a substantially smooth cylindrical surface on said magnetic material of said second part closely adjacent the pole faces of said magnet whereby hysteresis magnetic drag action between said pole faces and said smooth cylindrical surface effects rotation of said first part through one hundred eighty degrees upon initial rotation in either direction of said second part.

7. A switch comprising, first, second, and third parts, said first and second parts mounted for relative rotation, one of said first and second parts including a permanent magnet having pole faces, the other of said first and second parts having a substantially smooth surface closely adjacent the pole faces of said magnet to establish hysteresis magnetic drag action between said first and second parts, said second and third parts mounted for relative rotation, stop means cooperating between said second and third parts to limit the relative rotation therebetween to less than three hundred sixty degrees, a crank actuated by said limited relative rotation, a toggle joint mechanism actuated by said crank, a movable contact, a second contact carried on said switch for cooperation with said movable contact, said movable contact having first and second positions relative to said second contact, and means for operating said movable contact by said toggle joint mechanism in accordance with said limited rotational movement.

8. A switch comprising, first, second, and third parts, said first and second parts mounted for relative rotation, one of said first and second parts including a multi-pole permanent magnet having pole faces disposed on a generally cylindrical surface, the other of said first and second parts having a substantially smooth cylindrical surface closely adjacent the pole faces of said magnet to establish hysteresis magnetic drag action between said first and second parts, said second and third parts mounted for relative rotation, stop means cooperating between said second and third parts to limit the relative rotation therebetween to approximately one hundred eighty degrees, a toggle joint mechanism, a crank operable by said one hundred eighty degree movement between said second and third parts and connected to actuate said toggle joint mechanism, a movable contact, a second contact carried on said switch for cooperation with said movable contact, said movable contact having first and second positions relative to said second contact, means for operating said movable contact by said toggle joint mechanism in accordance with said limited arcuate movement, and one of said first and third parts being rotatable through an angular movement greater than one hundred eighty degrees.

9. A switch comprising, a frame, a movable switch blade, movable contact carried by said blade, a stationary contact carried on said frame for cooperation with said movable contact, said blade having first and second positions, a hysteresis actuator having first and second parts, said second part adapted for rotation greater than one hundred eighty degrees, stop means cooperating between said first part and said frame to limit rotation of said first part to one hundred eighty degree movement, a toggle joint mechanism operated by said first part and having a one hundred eighty degree limited rotation to alternatively lock said blade in said first and second positions, said first part comprising a multi-pole permanent magnet having pole faces disposed on a generally cylindrical surface, said second part having hysteresis magnetic material and being journalled coaxially with said first part, a substantially smooth cylindrical surface on said magnetic material of said second part closely adjacent the pole faces of said magnet whereby hysteresis magnetic drag action between said pole faces and said smooth cylindrical surface effects rotation of said first part through one hundred eighty degrees upon initial rotation in either direction of said second part.

References Cited in the file of this patent

UNITED STATES PATENTS

| | | |
|---|---|---|
| 1,222,720 | Bijur | Apr. 17, 1917 |
| 2,071,855 | Schaelchlen | Feb. 23, 1937 |
| 2,141,278 | Owens | Dec. 27, 1938 |
| 2,209,368 | Whittaker | July 30, 1940 |
| 2,415,344 | Eksergian | Feb. 4, 1947 |
| 2,475,169 | Zahn | July 5, 1949 |
| 2,483,122 | Bower | Sept. 27, 1949 |
| 2,659,785 | Butler et al. | Nov. 17, 1953 |
| 2,680,203 | Zozulin | June 1, 1954 |
| 2,734,957 | Beemer | Feb. 14, 1956 |